Jan. 25, 1944.   R. W. HODIL ET AL   2,339,855
MACHINE FOR TESTING ADHERENCE OF SHEET COATINGS
Filed May 5, 1942
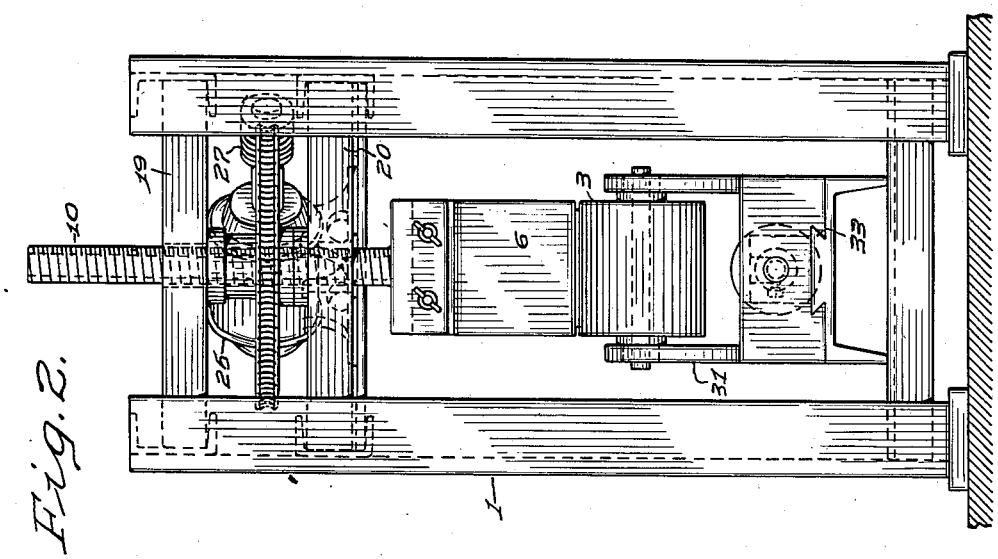
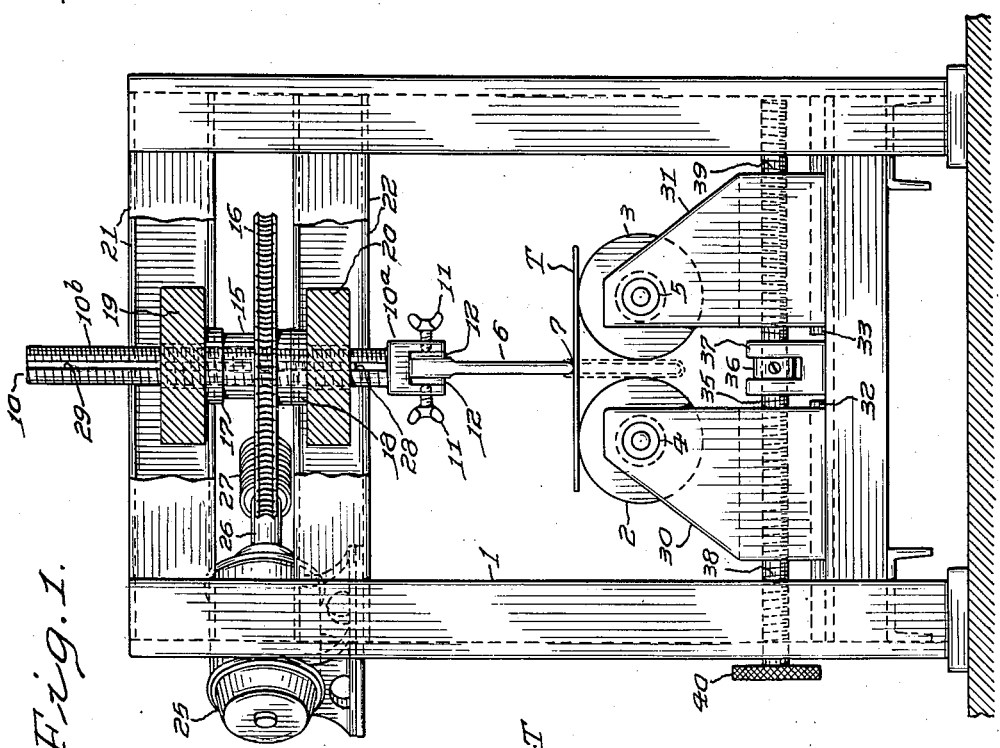
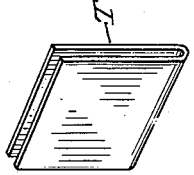
INVENTORS
Ralph W. Hodil,
John C. Redmond.

Patented Jan. 25, 1944

2,339,855

UNITED STATES PATENT OFFICE 2,339,855

MACHINE FOR TESTING ADHERENCE OF SHEET COATINGS

Ralph W. Hodil and John C. Redmond, Youngstown, Ohio

Application May 5, 1942, Serial No. 441,824

2 Claims. (Cl. 153—48)

Our invention relates to testing the adherence of coatings on galvanized sheets or the like and is particularly directed to the provision of a novel machine adapted therefor whereby standards for data based on the adherence factor may be formulated and established and uniformity of manufacturing specifications, requirements and products thereby promoted.

Several methods have heretofore been suggested for testing the adherence of coatings on galvanized sheets but none, so far as we are aware, has been susceptible of easy standardization and it has therefore not been practical for the industry to adopt or even formulate rigid standards or to insist upon their maintenance in production of galvanized products. Galvanized sheets consequently have in some instances been sold for purposes for which the adherence of their coatings is inadequate while in others sheets having an unnecessarily high degree of coating adhence are employed.

It is therefore a principal object of our invention to provide a machine in which under controlled predetermined conditions adherence of the galvanized or like coating on a test piece can be accurately determined and definitely expressed so as to permit a comparison between a tested specimen and a predetermined standard to be readily made and the character of the sheet in this respect made known in positive terms.

Another object is to provide a machine for testing which enables adherence of the galvanized or other coating on a sheet or test sample thereof to be determined in accordance with a standardized procedure and which thereby affords reproducible expressions of degree or character of coating adherence.

Other objects, purposes and advantages of the invention will hereinafter more fully appear or will be understood from the following description of one embodiment of our testing machine and of its employment in the practice of our testing method, reference being had to the accompanying drawing, in which:

Fig. 1 is a front elevation of the machine;

Fig. 2 is a side elevation thereof, and

Fig. 3 is a perspective view of a test piece or sample of galvanized sheet after subjection to test in accordance with our method in the machine shown in the preceding figures.

In the several figures, like characters are used to designate the same parts.

Referring now more particularly to the drawing, it will be understood the machine is in general merely diagrammatically illustrated therein as the principles embodied in it will thereby be sufficiently disclosed to enable them to be readily understood, the specific details of its construction being susceptible of modification in many particulars.

Thus, the machine consists essentially of a frame, generally designated 1, carrying a pair of spaced rolls 2, 3 rotatable on parallel horizontal axes and preferably mounted on antifriction bearings 4, 5. The frame also supports a reciprocable mandrel 6 movable vertically with respect to the rolls, the form and size of the mandrel being subject to modification and therefore usually spcified in connection with the requirements for tests. Hence it may be desirable to use a relatively thick mandrel when testing heavy sheets or plates or to use a thinner one when testing relatively light gauge material, but in any case the mandrel is preferably more or less rounded at its lower edge 7 and depends from frame 1 of the machine through its attachment to the lower end of a plunger 10 to the head 10a of which it is detachably secured as by thumb screws 11 bearing on interposed clamping blocks 12.

To enable the mandrel to be raised and lowered at will the stem 10b of plunger 10 is threaded and supported in a nut 15 forming the hub of a worm wheel 16 mounted between thrust bearings 17, 18 attached by cross blocks 19, 20 to rigid cross-channels 21, 22 included in the frame of the machine and a reversible motor 25 is mounted on the frame and carries on its shaft 26 a worm 27 engaging the wheel, keys 28 extending in keyways 29 in the plunger preventing it from turning when the wheel rotates about it.

Antifriction bearings 4, 5 carrying rollers 2, 3 are supported respectively on separate adjustable bases 30, 31 slidable along horizontal ways 32, 33 at the lower part of the machine. Their adjustment is controlled by suitable means such as a hand operated feed screw 35 held against axial movement by a collar 36 fitted into a fixed fork 37 and having oppositely inclined threads 38, 39 on either side of the collar cooperative with internal threads in the respective roll bases, whereby when the screw is turned, as by a hand wheel 40 at one end, the roll bases and consequently the rolls move toward or recede from each other, depending on the direction in which the screw is rotated.

In making a test of the adherence of a galvanized or like coating on a metal sheet or test piece thereof, such as a typical test piece T, rolls 2, 3 are adjusted so that the space between them is about equal to the thickness of the mandrel plus twice that of the coated sheet plus such additional space as will afford a sufficient clearance to prevent too great stress on the machine parts when the mandrel is operated to force the test piece between the rolls. The exact amount of this clearance, provided it be kept relatively small, apparently has no effect upon the accuracy of the results and it is therefore preferable to position the rolls particularly with a view to avoiding damage to the machine or test piece from too close adjustment.

When the rolls have been so adjusted and the mandrel raised to a position wholly above the upper horizontal plane tangent to them, the specimen or test piece T is laid upon the rolls beneath the mandrel so as to substantially occupy said upper horizontal plane. Motor 25 is then set in motion to move the mandrel downward first to engage the test piece and then to force it between the rolls, thereby bending it substantially into conformity with the mandrel as it passes between them. The effect of this operation is indicated by dotted lines in Fig. 1 and as shown more clearly in Fig. 3 causes a full 180° bend in the metal with offset corresponding to the thickness of the mandrel and curvature at the bend corresponding to that of its lower edge.

It will thus be evident that severe distortion of the test piece occurs during the descent of the mandrel and that the coating on the surface of the piece, as well as the base metal of the piece itself, is subjected to a controlled standardized stress induced by bending which affects the coating in proportion to the degree of its adherence; its appearance therefore indicates the extent to which the coating is to be considered an adequately adherent one. Thus, when our machine is equipped with a specified mandrel and a test made as above described with the mandrel moving during the test at a predetermined prescribed speed, the coating on the test piece may appear flaked or cracked after testing and thus indicate its adherence is below standard or, if it remains intact and shows little or no deterioration as a result of the test, it may be assumed that the sheet or plate from which the test piece was cut has a coating of sufficient adherence to conform to the requirements. We therefore believe the utilization of this machine will promote the formation and promulgation of standards of galvanized and like coating adherence and thereby greatly facilitate the attainment of uniformity of production, and of procurement specifications, which have long been sought in the industry.

While we have herein described our invention with considerable particularity, especially as embodied in a testing machine well adapted for the practice of the method contemplated thereby, it will be understood that changes and modifications in the form, structure and arrangement of the several parts of the machine as well as in the specific details of the practice of the method will readily occur to those skilled in the art and may be made if desired without departing from the spirit and scope of the invention as defined in the appended claims.

Having thus described our invention, we claim and desire to protect by Letters Patent of the United States:

1. A machine of the class described comprising a pair of rolls rotatable about parallel horizontal axes, means for translating the rolls in a horizontal plane simultaneously in opposite directions, a threaded plunger disposed above the rolls having a head at its lower end, a flat mandrel removably attached to and depending from the plunger adapted to enter between the rolls, a worm wheel in the hub of which the plunger is threaded, a worm engaging the wheel, and a reversible motor operative to drive the worm to thereby rotate the wheel and move the mandrel vertically and selectively in opposite directions whereby the mandrel can be moved between the rolls by operation of the motor in one direction and retracted therefrom by its operation in the opposite direction.

2. A machine for testing adherence of sheet coatings comprising a pair of rolls rotatable about parallel axes and adapted for engagement by a flat piece of coated sheet metal disposed across the space between them, means for moving the rolls toward and away from each other to vary the distance between the rolls, a reciprocable plunger carrying a flat mandrel having a rounded leading edge adapted when moved toward the rolls to cause the mandrel to engage the sheet and force it between the rolls, means for reciprocating the plunger, and means for enabling mandrels of different thickness to be applied to the plunger according to the adjustment of the rolls, each mandrel when so applied being movable a sufficient distance to carry the sheet at least partially beyond the plane of the roll axes and bend it through substantially 180° whereby to afford visual indication of the character of bond between the sheet and its coating.

RALPH W. HODIL.
JOHN C. REDMOND.